United States Patent
Hagenlocher

[11] Patent Number: 6,056,240
[45] Date of Patent: May 2, 2000

[54] SUPPORT FOR AN AIRSHIP

[75] Inventor: Klaus Hagenlocher, Friedrichshafen, Germany

[73] Assignee: Luftschiffbau GmbH, Germany

[21] Appl. No.: 08/879,778

[22] Filed: Jun. 20, 1997

Related U.S. Application Data

[63] Continuation of application No. 08/740,404, Oct. 29, 1996, abandoned, which is a continuation of application No. 08/630,930, Apr. 5, 1996, abandoned.

[30] Foreign Application Priority Data

Apr. 5, 1995 [DE] Germany .......................... 195 12 774

[51] Int. Cl.⁷ ...................................................... B64B 1/08
[52] U.S. Cl. .......................... 244/125; 244/131; 403/169
[58] Field of Search .................................. 244/119, 123, 244/131, 125; 403/169, 170, 217

[56] References Cited

U.S. PATENT DOCUMENTS

| | | |
|---|---|---|
| 1,191,077 | 7/1916 | Hermanson . |
| 1,541,827 | 6/1925 | Laisy . |
| 1,715,829 | 6/1929 | Geisler . |
| 1,760,883 | 6/1930 | Moss . |
| 4,457,249 | 7/1984 | Disen . |
| 5,015,116 | 5/1991 | Nardone et al. . |
| 5,059,057 | 10/1991 | Graef . |
| 5,110,070 | 5/1992 | Hagenlocher et al. . |

FOREIGN PATENT DOCUMENTS

| | | | |
|---|---|---|---|
| 2222574 | 8/1973 | Germany | ................................ 403/170 |
| 207500 | 11/1924 | United Kingdom | ................... 403/170 |
| 937371 | 9/1963 | United Kingdom . | |

*Primary Examiner*—Peter M. Poon
*Assistant Examiner*—Tien Dinh
*Attorney, Agent, or Firm*—Evenson, McKeown, Edwards & Lenahan, P.L.L.C.

[57] ABSTRACT

The invention relates to the manufacturing of structural members which are extremely light but can be highly stressed and are designed as a framework, mainly in the field of aviation but also in other technical fields where the framework supports, as large-volume components, are to have a weight that is as light as possible. Sleeve connectors are provided which are designed so that the tubes to be connected to a framework node are covered in a form-locking manner by means of sleeve parts of a sleeve connector which can be glued adjacent to one another on the nodal point, the whole nodal point with all tubes entering at this point being enclosed by the parts of the sleeve connector.

15 Claims, 8 Drawing Sheets

SUPPORT FOR AN AIRSHIP

This application is a continuation of application Ser. No. 08/740,404, filed on Oct. 29, 1996 now abandoned, which is a continuation of application Ser. No. 08/630,930, filed on Apr. 5, 1996 now abandoned.

BACKGROUND AND SUMMARY OF THE INVENTION

This invention relates to a structural member of the type used to form a supporting framework for an airship.

In the field of aviation, particularly in rigid and semirigid airships, as well as also in the field of structural engineering, light-weight structural members are required as structural elements for large-volume framework constructions. In order to accommodate the large pressure loads, which can occur in such constructions, structural members used for this purpose usually consist of three parallel longitudinal chords, with struts disposed diagonally therebetween, connecting the three longitudinal chords with one another at nodal points, to create an elongated polygonal structure, which is used in turn to form longitudinal beams and transverse spars of the supporting framework for an airship.

For example, German patent document DE-PS 520664 discloses a structural member having three longitudinal chords, with struts arranged therebetween. The longitudinal chords consist of three profiles with an inwardly open cross-section, between which strut devices are arranged which have two chord devices, which are each connected to different cross-section sides of the longitudinal profile. Connections between the longitudinal profiles and the strut device are made by rivets. The longitudinal profiles and the transverse struts are made of especially shaped parts, and must have flanges in order to be able to carry out the riveted connection. However, even in the case of a simple arrangement of this type, the construction is cumbersome and time-consuming so that certain, construction-related sizes and weights cannot be avoided.

In German patent document DE-PS 610976, a support construction for airships is described in which achieves a corner profile reinforcement relative to earlier constructions, without any increase in weight. For this purpose, additional construction strips made of sheet metal are provided which are not curved in their center part but are essentially planar, and are arranged such that they connect the corner profile edges with one another in a chord-type manner.

Such a planar construction strip prevents bending-out to any side. The weight of the strips is reduced by means of holes and recesses and the strips are kept narrower by beaded flanges which, in turn, saves more weight.

The node points for the support which are joined in this manner must not fall below a certain size and weight, because the introduction of force at the node points presents problems. patent document GB-PS 123604, discloses a support construction which uses parallelogram-type elastic frames formed of a laminated material. Such frames are arranged next to one another in a certain sequence in the longitudinal direction between the supporting spars, and are fastened on the support. The frames are fastened to one another and to the chords by gluing or pasting. By means of this arrangement, the stiffness of the keel (support) is improved, without an increase in weight.

German patent document DE-PS 657909 describes a tube-shaped light-weight material component consisting of cellulosics, or paper or fiber materials impregnated or perfused with such cellulosics. Several such tubes, can be joined and glued together to form bundles, by means of a free solvent or a solvent interspersed with cellulosics. These bundles may also easily be sheathed by means of an enveloping shell made of the above-mentioned fiber materials, such as a paper web. In this patent, a special embodiment is described in which two tubes are arranged at a right angle to form a T-piece, and are glued together by means of a solvent to form a unit. Additional information concerning this type of a T-shaped arrangement (that is, the construction of a simple node) is not found in this patent document. When a tube-shaped component is pushed into one of the openings of the T-piece, an internal adhesive which may be required for the assembly is damaged in the area of the overlapping of the pushed-in components, and a secure glued connection of the components, which is absolutely necessary, is not achieved. support construction is found in Swiss patent document CH-PS 49 829, in which a support is composed of smaller, four-cornered or rectangular frames. By joining the frames in the longitudinal direction, a support or keel for receiving the gondola, etc. is provided in the longitudinal direction of the airship. Adjacent frames fitted together in this manner are connected and reinforced by diagonal tension wires so that a uniform rigid support is obtained.

The tube-shaped extensions on the frames, which are provided to join the frames, in this case, are pushed into the extensions and connections of the adjoining frame. However, this design has the above-mentioned serious disadvantage; specifically that a possibly required adhesive in the area of the pushed-together extension is not reliably effective and distributed in a uniform manner. Thus, when considered as a whole, the stability of this nodal point is unsafe.

When assessing the state of the art known on the basis of the above-mentioned patent documents, it is noted that each of the constructions indicated as an example has considerable defects.

It is demonstrated that a problem exists in that the tubes which are to be used are highly loadable, but are also locally very sensitive with respect to the introduction of force. These tubes are produced from highly stressable materials, together with bracing parts made of a corresponding material. Maximal can be borne by using such a highly stressable construction material (for example, by means of chemical-fiber-reinforced tubes) only if the nodal connections also introduce force into the structural member optimally at every point. Thus, special attention must be paid to the nodal connection: not only to the specific material for the node parts, but also to provide a design which achieves an optimal introduction of force into the support.

The disadvantages found in the prior art are mainly that
a) despite the selection of highly stressable materials, the high stability provided by these materials cannot be completely utilized;
b) the introduction of force into the support takes place non-uniformly and, as a result, premature failure is possible;
c) the adhesive connection cannot be tested with respect to a complete and uniform glued connection;
d) a large scattering of the stability values results in considerable difficulties, and, during the development and construction of nodal points, no reliable values and guarantees can be supplied; and
e) the manufacturing is not economical. is an object of the present invention to eliminate the above-mentioned disadvantages of the previous state of the art, and to provide a nodal connection for supports in which the stability characteristics of the support and of the strut can be fully utilized, and in which forces are distributed within the structural member in an optimal manner.

This object is achieved in a structural member with longitudinal chords and struts which are connected with one another at respective nodal points, by the nodal point configuration according to the invention, which consists of at least one base shell having trough shaped longitudinal channels for receiving the longitudinal chord and the transverse struts, and at least one closure shell which, together with the at least one base shell, completes a sleeve-type enclosure of the longitudinal chord and the transverse strut together with the base shell, in a form-locking fashion.

Other objects, advantages and novel features of the present invention will become apparent from the following detailed description of the invention when considered in conjunction with the accompanying drawings.

BRIEF DESCRIPTION OF THE DRAWINGS

FIG. 2b is an enlarged view of a portion of the support as indicated in FIG. 2a;

FIG. 3b is a cross-sectional view of FIG. 3a taken along section line IIIb—IIIb of FIG. 3a;

FIG. 5b is a slightly enlarged lateral view of FIG. 5a;

FIG. 5c is a slightly enlarged view of the arrangement according to FIG. 5a.

DETAILED DESCRIPTION OF THE DRAWING

For the illustrated embodiment, the nodal connection according to the invention, which operates in the manner of a sleeve, consists essentially of three parts: two laterally disposed base shells, and one closure shell, which serve to connect the chord tube 5 and the diagonal tubes 6. When glued together these three parts result in a local reinforcing of the tubes, which also has a form-locking effect.

In order to ensure a perfect glued connection, the sleeve connectors are divided such that adhesive can be applied to their interior side, so that during the fitting-together, the individual parts can be placed on the tubes without longitudinal displacement of the parts which pushes away the applied adhesives (epoxy bonding agent) and may cause faulty glued connections.

The connection parts are produced in pressing molds with a glass fabric or glass fabric prepreg. The selection of fiberglass-reinforced plastic material (GFK) for the connection parts has two advantages:

The connection will be more elastic than the very stiff carbon-fiber-reinforced (CKF) tubes. The load transmission is therefore better distributed;

the quality of the glued connection can be controlled through the transparent connection parts because inclusions of air and defects are visible.

Additional technical characteristics are:

In the connection area, the individual parts—base shells and closure shell (or lateral parts and center part)—are provided with projecting gluing flanges 4 so that in the glued-together condition the parts form a complete envelope and therefore reinforce the tubes in the clamping area, facilitating absorption of additional moments resulting from displacements under a load at the nodal connections.

The transitions of the connection parts to the tubes are rounded for reducing tension peaks 12.

The wall thickness of the lateral and center parts is thinner toward the outside to the free tube in order to obtain a transition which is free of notch tension.

Manufacturing process for CKF(Carbon-Fiber-Reinforced) Framework Supports

In a simple device, the three chord tubes are fixed in parallel to one another to provide a support cross-section measurement.

The diagonal tubes are cut to length and are provided with a bevel cut.

A set of connection parts (three each) is prepared for gluing in that an interior protective covering is pulled off, so that the gluing surface is completely clean. A bonding agent is applied or film adhesives are inserted as cut-to-size shaped parts. Approved epoxy bonding agents are used for high-quality aviation parts.

The center part (closure shell) is fixed on the chord tube at the position of a nodal connection and the, for example, four diagonal tubes are inserted.

Then the two lateral parts (base shells) are placed on top. By placing the parts onto the tubes in this manner rather than pushing the tubes into closed sleeves, perfect gluing is permitted. The three parts are next pressed together under spring pressure by means of shaping tongs which correspond to the exterior shape of the nodal connection. The shaping tongs are heated by means of an electric heating cartridge and are controlled by means of a thermostat to a constant temperature of 80° C. to 120° C. according to the type of adhesive.

Thereafter, the next nodal point is prepared and is glued together by means of shaping tongs in the same manner.

When eight to ten shaping tongs are used, in the case of a hardening time of the adhesive of approximately 20 minutes, a support can be continuously produced in that the shaping tongs used first are in each case removed and are applied to a new node. With respect to this process, reference is made to FIG. 2b in which the respective basic traits are outlined.

As an alternative, a larger number of shaping tongs which are not heatable, may also be used (at reasonable cost). The support will then be assembled along a larger length and a heatable hood will be pushed over the support.

Simultaneously, the nodal connections will then be hardened, for example, along a length of 2 to 3 m. In this manner, supports can be produced at low cost which are easy to test and thus meet regulatory requirements applicable in the field of aviation.

As tests have shown, the nodal connection according to the invention is of such a high quality that, during all tests, the tubes themselves (rather than the nodal connections) failed. The layout of the supports can now be achieved by means of theoretical calculations, since only the stability of the tubes must be taken into account.

Depending on the type of support to be produced, the connection parts are produced with the corresponding number of connecting possibilities for the diagonal tubes. The mold making for this purpose is comparatively simple.

These nodal connection may be used for supports of different materials.

The following characteristics are significant with respect to the invention:

1. Sleeve connectors for producing framework supports made of thin-walled tubes are designed such that the tubes to be connected on a framework node are form-lockingly enclosed by the glued-on sleeve connectors. For this purpose, the sleeve connectors are divided peripherally into three parts, along longitudinal lines on the tubes to be connected: a center part (closure shell) 2 and two lateral parts (base shells) 1. They are also provided with overlapping flange surfaces 4 that, after the glued connection, provide the same stability as that of a tube of the same thickness. The end portions 7 of the sleeves which surround the chord tube 5 and the diagonal tubes 6 have a smaller wall thickness in order to achieve a notch-free transmission of force from the chord tube and from the diagonal tube into the sleeve connectors.

2. The sleeve connectors may be constructed for three-chord or for multichord supports.

3. The number of tubes to be connected to a framework node by means of a sleeve connector determines the construction of the sleeve as a double 10 or multiple sleeve 11. (See FIG. 2*b*.)

4. Preferably fiber-glass-reinforced plastic material is chosen for the sleeve connector.

The following is a detailed description of the figures.

Figure 1A:
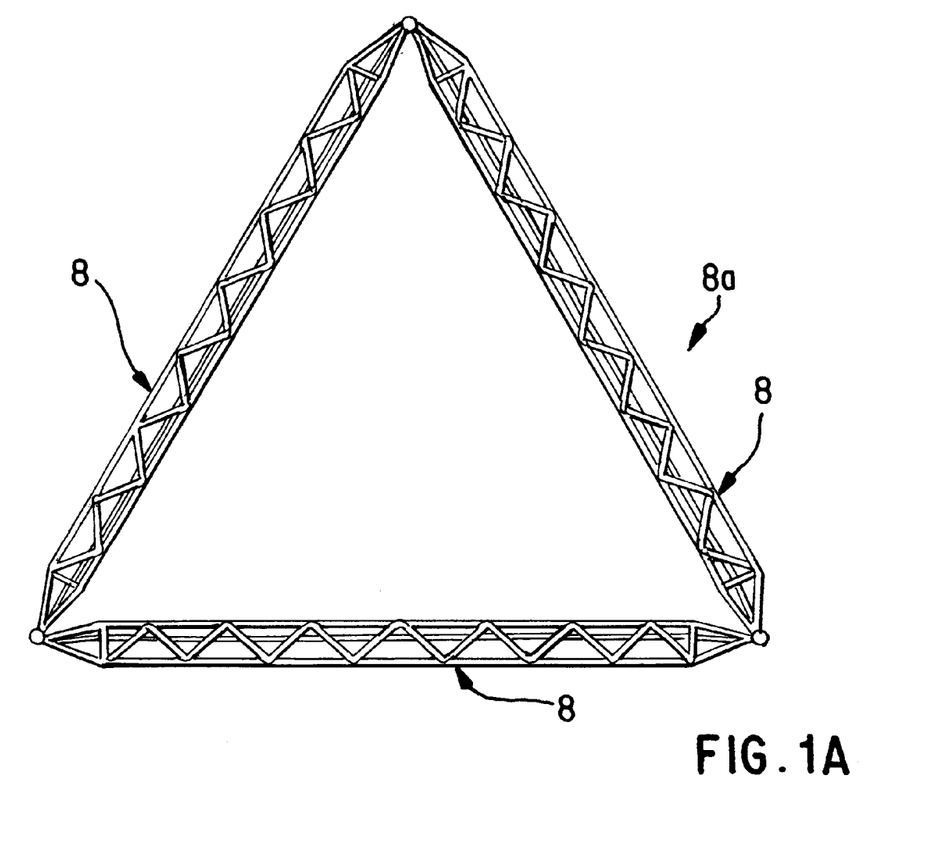
FIG. 1A shows the basic construction of a supporting framework for an airship, in which a transverse spar element comprises a structural member according to the invention.
Figure 1B:
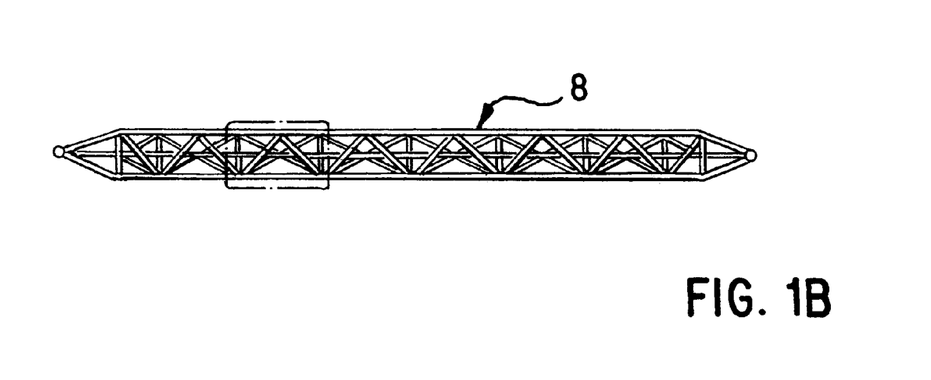
FIG. 1B is a separate view of the transverse spar element of FIG. 1A.

FIG. 1A illustrates the basic construction of a supporting structure for airships according to the invention. As an example, a transverse spar element 8*a* is shown as composed of three straight support members 8. In a known manner which is not described in detail, longitudinal beams of the airship extend from the three corners of the transverse spar element essentially perpendicularly to the plane of the transverse spar element, to corresponding corners of an adjacent transverse spar element situated in front of or behind it in the longitudinal direction of the airship. The construction of these adjacent support members is similar to that of the individual supports shown in FIG. 1, and is therefore not specifically illustrated and described because the construction is known per se. FIG. 1B is a top view of the support member 8 of the transverse spar element 8*a*, which shows the framework-type construction of the support in greater detail. As mentioned above, such support members are also used as longitudinal beams in the supporting structure of an airship, fixing the distance between two successive transverse spar elements.

Figure 2A:
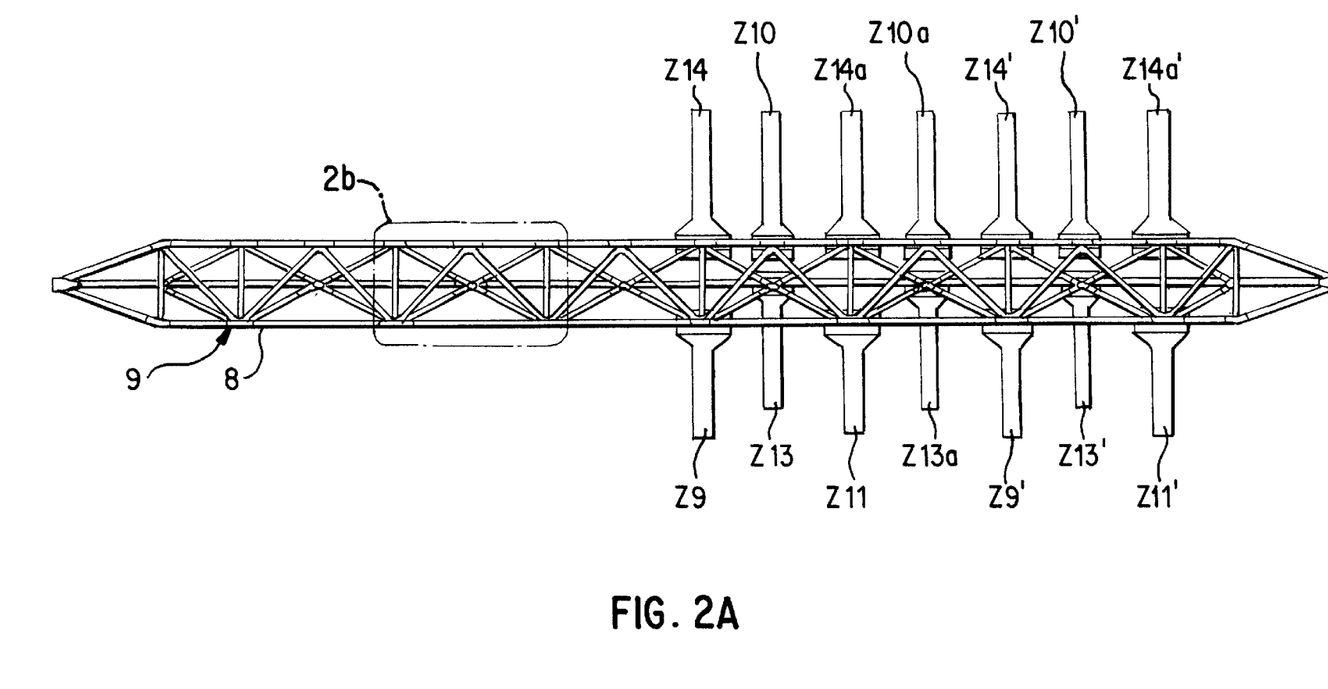
FIG. 2a is an enlarged view of an individual support from a supporting structure as shown in FIG. 1A.
Figure 2B:
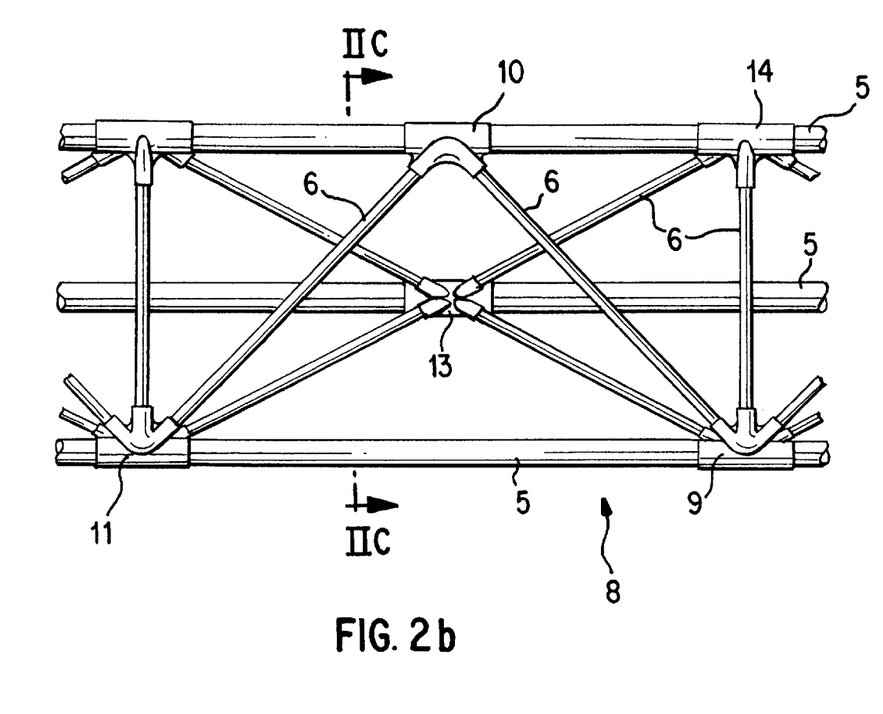
Figure 2C:
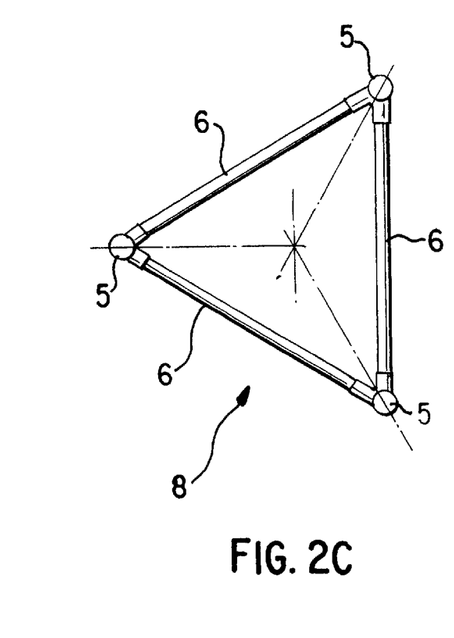
FIG. 2c is a cross-sectional view of FIG. 2b taken along section line IIc—IIc.

FIG. 2*a* is a more detailed lateral view of an elongated support member 8, while FIG. 2*b* is an enlarged portion of a support member 8, and FIG. 2*c* is a cross-sectional view of the construction of the support member 8.

These figures show where the nodal points are situated in the improved structural member according to the invention. As shown in FIGS. 2*b* and *c*, each member 8 consists of three parallel longitudinal chords 5 which extend in the longitudinal direction of the support. In the planes formed by each pair of longitudinal chords 5 respectively, diagonal struts 6 are arranged between the chords 5, usually extending diagonally at a specific angle with respect to the chord 5. However, the struts 6 may also be arranged at different angles and even at a right angle with respect to the chord 5. The fastening points of the struts 6 on the chord 8 form the above-mentioned nodal points 9. Depending on the number of struts leading away from it, and on the size of the angles formed at the departure of the struts from the chord, each of these nodal points may have a different design.

Thus, for example, at nodal point 10 (FIG. 2*b*), only two struts 6 are provided, both of which are disposed in a support plane which includes the upper and the lower chord tube 5. In the case of the nodal point 13, on the other hand, two struts are arranged in the support plane which includes the upper and the center chord, and two additional struts are arranged in the support plane which includes the center chord and the lower chord 5, for a total of four struts. At nodal point 14, two diagonally situated struts 6 depart in a support plane analogously to nodal point 10 but, in addition, an individual strut is arranged in a transverse manner in another support plane, so that three struts 6 depart from this nodal point. Finally, at nodal points 9 and 11, three struts 6 are situated in the plane which includes the upper and the lower chords 5, and two additional struts 6 are situated in the plane formed between the center chord and the lower chord 5. Thus at this nodal point five transverse struts 6 meet.

Naturally, also the end of an individual strut can form a nodal point with the chord 5, or several struts may be guided together in a plane at different angles. All variants of the design of a nodal point of the chord applying to one support plane can be combined with node variants for a second support plane containing this chord and occurring there. In this regard, it should be noted that any two of the above-mentioned support planes respectively intersect along a chord, and that nodal points can occur only along this intersection line. It is of course also possible to make the arrangement such that more than two support planes have a common intersection line and that therefore more complicated nodal points are possible.

FIGS. 1 and 2*a*–2*c* show clearly the quantities and the number of variants in which such nodal points are required in the case of an airship supporting structure. The importance of a fast, but nevertheless perfect production of these components is thus apparent.

FIG. 2*a* also shows the above-mentioned possibility of hardening the adhesive in individual nodal points by heating them. It is assumed in this case that a support is constructed as shown in FIG. 2*b* for a support section. For this reason, the same reference numbers are used for the nodal points in the successive support sections. Heatable shaping tongs for heating the individual points are marked according to the respective nodal point, for example Z9 or Z10; tongs of mutually corresponding nodal points, in the subsequent support sections, are, for example, marked Z10 and Z10*a*, etc. After carrying out their task in a first support section, such tongs are removed, and are used again in a succeeding section, as indicated by a prime mark, for example, Z10, Z10' or Z14*a*, Z14*a*'. This clearly shows the process which progresses in a constructional direction. The shaping tongs, which are shown in the drawing only schematically, are conventional and well known to these skilled in the art.

Figure 3A:
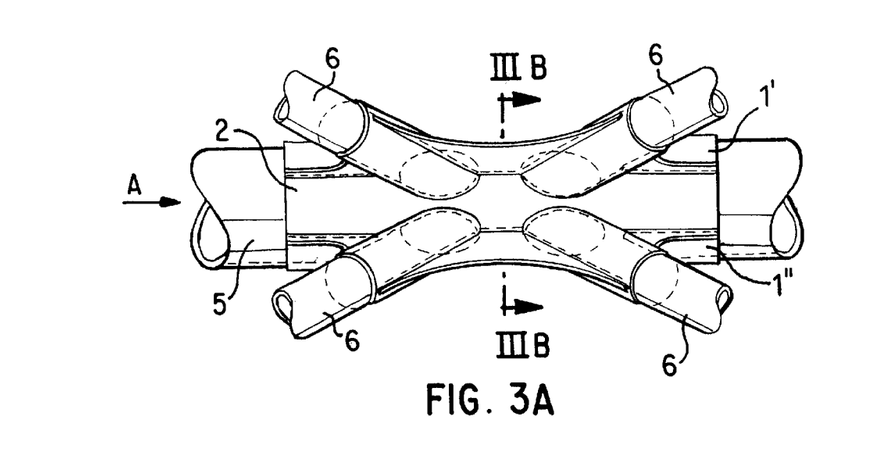
FIG. 3a is a view of a nodal point of a supporting structure according to the invention, with the arrangement of shell-type connection sleeves at the nodal points.
Figure 3B:
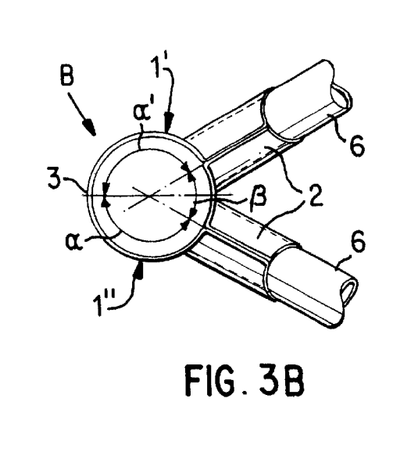

FIG. 3 shows a nodal point comparable to nodal point 13 in FIG. 2b, in which the diagonal struts 6 are arranged in two different planes that intersect in chord 5. In each of these two planes, two struts 6 are fixed on the longitudinal chord 5 by means of the sleeve-type connector. As best seen in FIG. 3b, the connector consists of two base shells 1' and 1" which abut along a generating line 3 of the chord 5, each having a longitudinally extending trough shaped channel into which the chord can be placed, enclosing the chord 5 along an angle α. In addition, the shells 1 and 1', 1" also contain longitudinal trough shaped channels of the size, and extending outwardly from the nodal point in the direction, of the struts 6 to be connected.

Figure 4A:
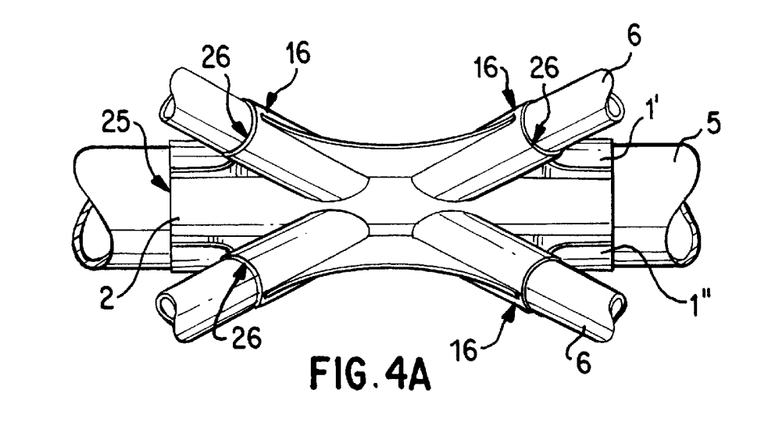
FIGS. 4a and 4b are views of the assembled structural components for a connection sleeve, showing individual parts of the sleeve.
Figure 4B:
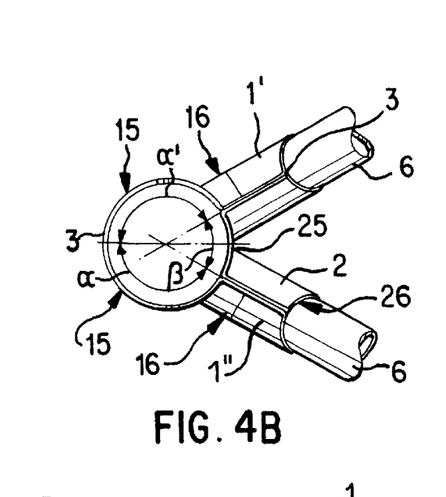
Figure 5A:
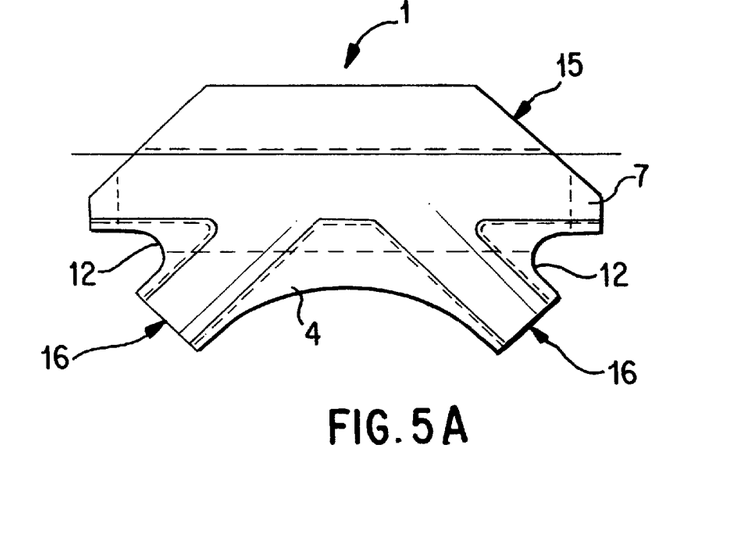
FIG. 5a is a view of a base shell of a connection sleeve which is slightly modified with respect to FIG. 4c.

In the case of a symmetrical construction of the nodal point (such as nodal point 13 in FIG. 2b), the two base shells 1' and 1" have an identical design. The longitudinal channels for the chord 5 provided in the base shell 1 have the reference number 15 and the indentations provided for the struts 6 have the reference number 16 (FIGS. 4, 5).

During the assembly of the structural components, the chord 5 and the struts 6 are placed in one base shell 1; then the other base shell area 1", together with the struts 6 assigned to it are placed on the first bottom shell area and the chord 5 is therefore surrounded by the angle 2α (FIG. 3b). A remaining angle β remains free and can be covered by a closure shell 2, as shown in FIGS. 3a, 3b. Also in the closure shell 2, trough shaped channels extend axially in the direction of the respective struts 6, and are adapted in their shape or their dimensions to the shape and size of the chord 5 or of the struts 6. As shown in FIGS. 4a–4d, in the closure shell 2, the channels which receive the chord 5 have the reference number 25 and the indentations for the struts 6 have the reference number 26.

The closure shell 2 completes the enclosure of the chord 5 by the components of the sleeve type connector. As shown, by a favorable arrangement of the above-mentioned generating line 3, all shell parts are easily accessible in the open condition, and all components, such as the chord and the struts, can be easily and precisely placed in the assigned indentations. In the case of the simple form of the sleeve connector shown here in the example, no special further developments or differences of the abutting base shell parts exist, so that identical parts may be used as a basis and these parts can be indicated to be lateral parts 1' and 1". A more precise marking will only be required when the base shells are divided further and either several base or bottom shells or several top shells (closure shells) are created by the division of the angle α or β.

Figure 3C:
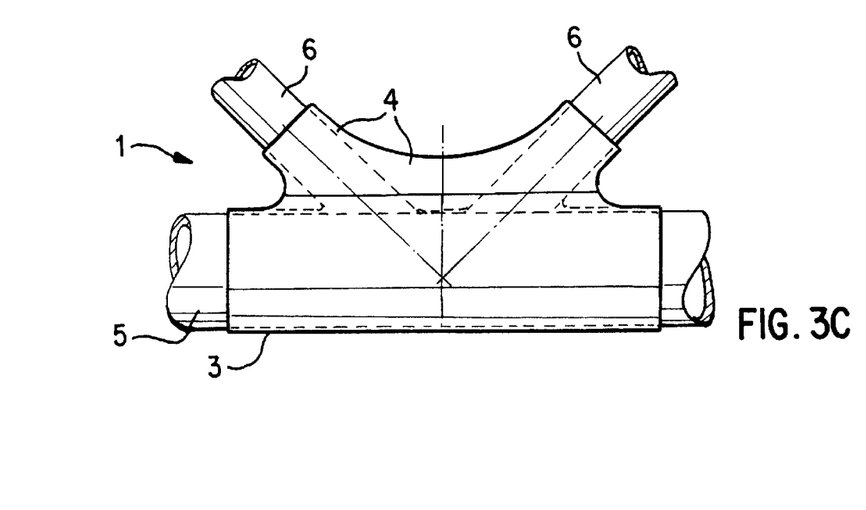
FIG. 3c is a lateral view with respect to FIG. 3a in the direction of the arrow B of FIG. 3b.
Figure 4C:
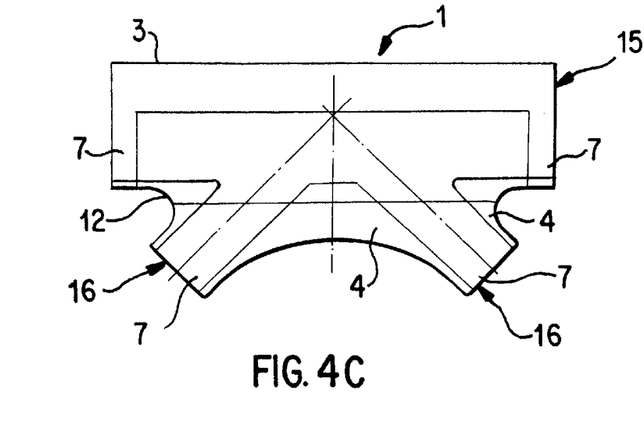
FIG. 4c is a view of a base shell of the connection sleeve constructed as a lateral part.
Figure 4D:
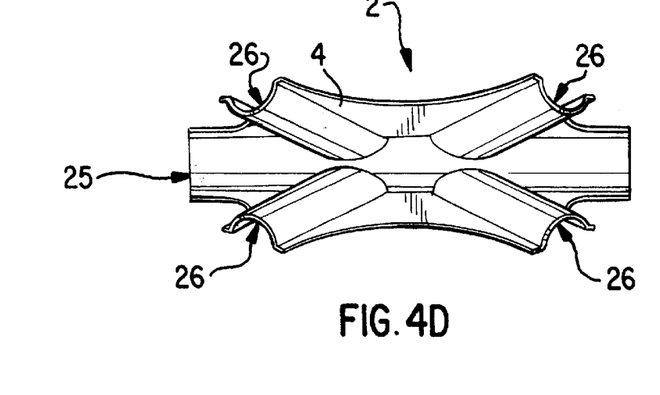
FIG. 4d is a top view of a closure shell for two pairs of struts arranged in separate planes, which closure shell forms the center part of the connection sleeve.

At the contact points of the connector components, a flange 4 is provided by means of which the parts can be fixedly glued to one another (See FIG. 3c, 4c and 4d). No special difficulties occur during insertion of the chords 5 and struts 6 or during the fitting-together of the connector components, because the individual components are held in the channels in a form-locking and also force-locking manner by means of the glued connection. However, as required, additional measures may be provided in order to prevent a longitudinal displacement of the shell parts with respect to one another or with respect to the chord 5. For this purpose, fixing teeth or projections or the like may be considered. The gluing flanges 4 may be significantly widened in part and are provided with a rounding 12 (FIG. 4c) in order to avoid tension peaks at endangered points.

Irrespective of in what number or shape the base shells or lateral shells are provided, and also in which arrangement the closure shells are to be installed, in each case, a complete enveloping of the chord 5 is achieved and also an enveloping of the struts 6 meeting at the nodal points, which reinforces the stability of the bond at the nodal point.

An adhesive is applied to the interior surfaces of the open shells, that is, into the open lateral parts or closure shells. Since this is a known operation, it will not be described in detail. It should only be mentioned that the adhesive may be applied in liquid form or as a film. As a result, it is very simple to coat the interior side of the shell, particularly the channels for the diagonal struts, in uniform manner. It is also possible to provide the adhesive film at least at points with a peelable cover layer or protective layer (compare FIG. 5b).

Advantageously, the diagonal struts 6 are cut diagonally on their end, so that they can be placed on the chord 5 is a smooth manner. The cut may even be provided with a certain curvature to adapt to the curvature of the chord 5. Because of the complete enclosure of the chord 5 by means of the lateral shells (base shells 1', 1") and the closure shell 2, however, an absolutely precise adaptation of the intersection point is unnecessary.

The parts of the kit forming the sleeve connection—two identical base shells (referred to here as "lateral" parts), and a supplementary closure shell—can be easily produced in large quantities and can be coated with the adhesive. These components preferably consist of a fiber-reinforced plastic material, such as fiber-glass-reinforced plastic.

The chord tube 5 and the struts 6 which, as mentioned above, are preferably cut off diagonally at their ends, and the joint between the chord 5 and the strut 6, can easily be recognized in their arrangement in FIG. 3c. After the insertion of the chord 5 and of the struts 6 of one longitudinal plane of the support into a first base shell or lateral part, such as 1", the adjoining lateral part 1' is placed in position adjoining the circumference of the chord 5, with the struts 6 for the second longitudinal plane of the support placed into the channels assigned to them, the closing closure shell 2 can be placed on the longitudinal edges of the base shells or lateral parts 1' and 1" in such a manner that the closure shell 2 closes the remaining open angle β on the chord 5, thus precisely enclosing the remaining side of the struts 6 situated in the channels 16 of the lateral parts. The individual shell parts or lateral parts 1' and 1" as well as the closure shell 2 of the connection sleeve are connected by the gluing of the edge flange 4. Even if the chord and the struts do not have a circular cross-section, but are formed, for example, of polygonal components, this type of sleeve connection can be used by means of adhesives at the nodal points irrespective of the material of the chord or of the struts. The use of fiber-reinforced material, such as fiber glass plastic material, is preferably suitable.

The shell-type parts 1', 1", 2 of the subassembly with their indentations 15, 16, 25, 26, after being fitted together, enclose the nodal point completely, with the struts 6 departing from the nodal point situated in two separate planes of the support construction, as noted previously, and the two longitudinal planes intersecting in the chord at an angle β.

As clearly indicated, a sleeve connection for a support plane may be formed in a simple manner by only two shells or lateral parts. However, also for three planes intersecting in the chord, a sleeve connection is possible; the angle β formed in FIG. 3b between the planes must only be correspondingly divided by means of the closure shell to be inserted there. In this case, the chord cross-section or the strut cross-section need not necessarily be circular but may also have a different design and may, for example, be elliptical or polygonal.

FIG. 4 again is a view of several parts and the overall view of the structural components of a connection sleeve for two support planes. It differs only insignificantly from the arrangement according to FIG. 3. The base shells or lateral parts have the reference numbers 1' and 1". The longitudinal trough shaped channel provided for the chord 5, in the lateral part 1, again has the reference number 15; and the indentations for the struts 6 have the reference number 16. Analogously, in the closure shell 2, the indentations for the chord 5 have the reference number 25 and the indentations for the struts 6 have the reference number 26. Here also, the two lateral parts abut along a generating line 3 of the chord 5. A corresponding separating generating line 3 also created along the struts 6, on which protruding gluing flanges 4 are provided, with widenings between the struts 6 and the chord 5. At the transition points of the struts 6 to the chord 5, the gluing flanges 4 are provided with roundings 12 in order to absorb possible tension peaks. At the ends of the components or shells, where the struts or the chord emerge from the enclosing sleeve parts, a reduction of the wall of the shell part is provided in order to obtain a notch-free introduction of force from the strut or chord to the sleeve. This wall reduction point on the shells of the sleeve parts has the reference number 7.

Figure 5B:
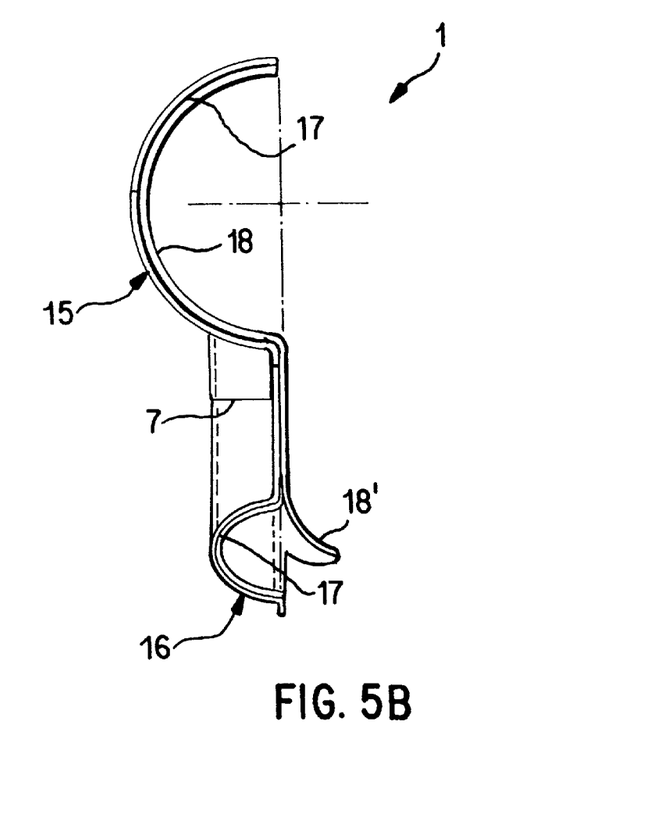
Figure 5C:
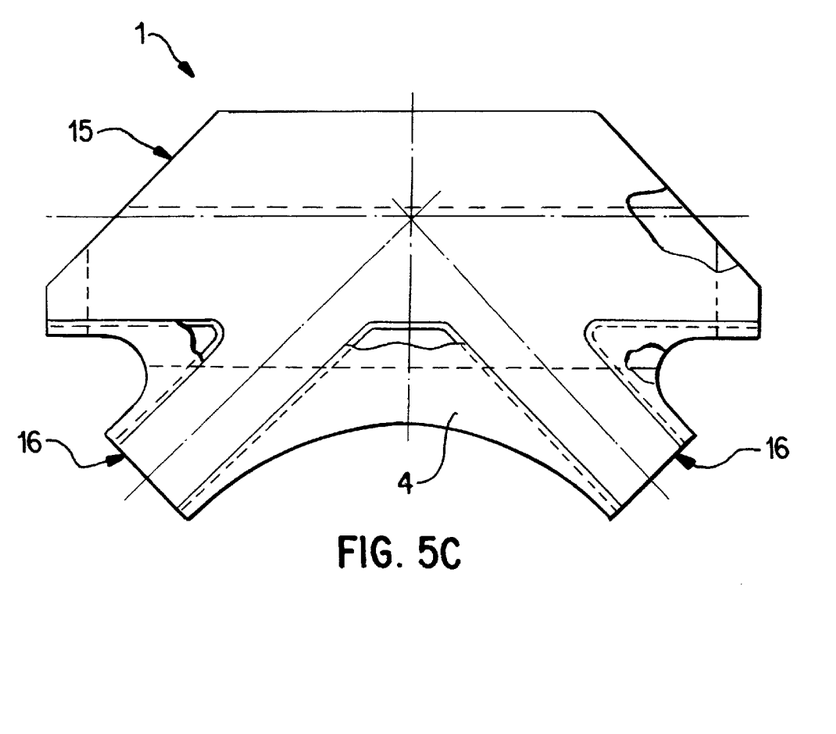
Figure 6A:
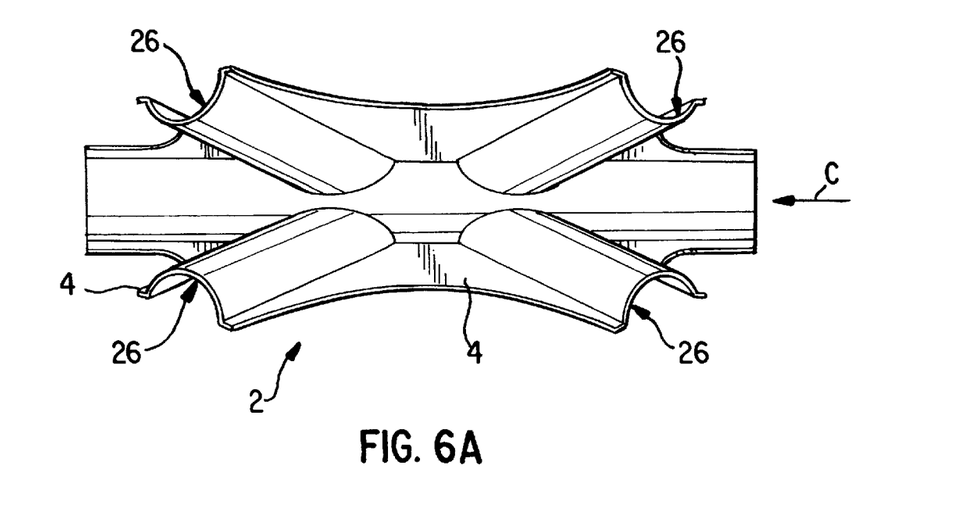
FIGS. 6a to 6d are four different views of a closure shell which completes the connection sleeve.
Figure 6B:
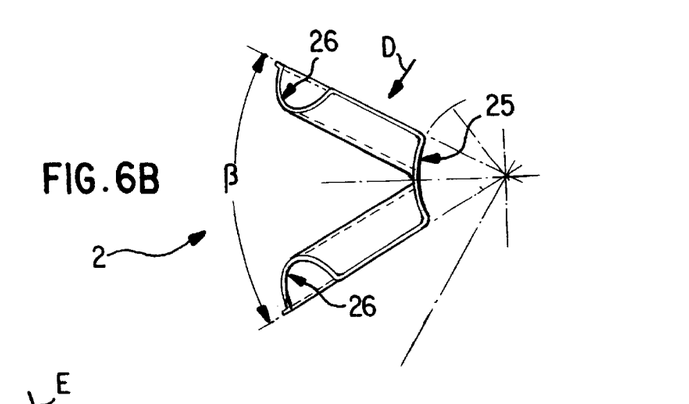
Figure 6C:
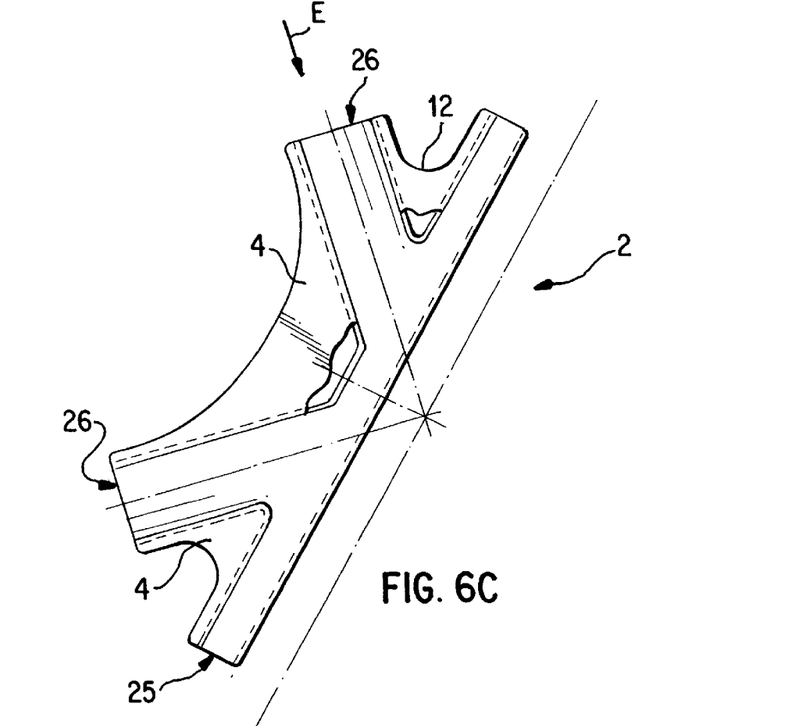
Figure 6D:
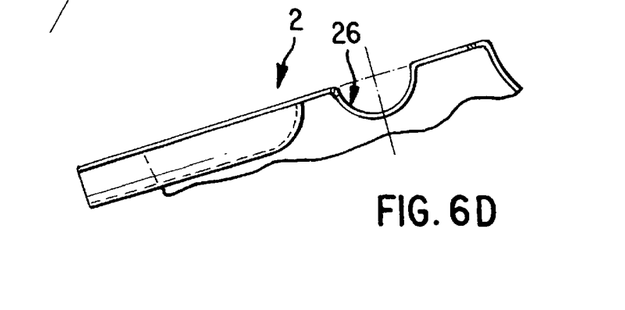

FIGS. 5a–5c show different views of a base shell or lateral part 1. FIG. 5c clearly indicates the position and the direction of the longitudinal trough shaped channels 15, 16 for the chord 5 and the struts 6, respectively. Also the shape and the position of the gluing flange 4 are clearly shown: FIG. 5b is an end view, which illustrates the shape and size of the longitudinal channels 15, 16, as well as the reduced wall thicknesses of the shell parts and their wall reduction step 7. thickened line indicates a thin and uniformly applied adhesive layer 17 on the interior side of the shell, which is protected, for example, by means of a pull-off cover layer 18. In the drawing, the extreme end of the cover layer 18 is shown slightly bent at the left edge of the shell 1, in order to show the possibility of pulling-off the protective layer.

Analogously to the preceding, FIGS. 6a to 6d illustrate the details of the closure shell 2. In particular, the remaining circumferential angle β enclosed by the closure shell 2 and the relatively shallow channel 25 (in which the chord 5 rests while the sleeve is completely closed) can be seen. To illustrate the shape of a closure shell which can be used in the subassembly for a connection sleeve according to the invention, the following views are drawn separately in FIG. 6; specifically, in FIG. 6a, a top view of a closure shell 2; in FIG. 6b, an end view in the direction of the arrow C of FIG. 6a; in FIG. 6c, a view in the direction of the arrow D of FIG. 6b; and in FIG. 6d, a view in the direction of the arrow E of FIG. 6c.

In this manner, at the nodal points, by way of the sleeves, a simple but fixed and defined connection is created which, in comparison to the stability values of the chord and the struts is not weaker, and permits the full utilization of the stability values of the structural elements (chord and strut).

Although the invention has been described and illustrated in detail, it is to be clearly understood that the same is by way illustration and example, and is not to be taken by way of limitation. The spirit and scope of the present invention are to be limited only by the terms of the appended claims.

I claim:

1. A structural member for a supporting framework of an airship, said structural member comprising:
at least three longitudinal chords which extend in parallel with each other to form a polygonal structure; and
a plurality of diagonally extending transverse struts which connect nodal points of the longitudinal chords via a plurality of nodal point couplers situated at said nodal points:
wherein each of the said nodal points couplers comprises
at least one base shell having trough-shaped channels for receiving at least a longitudinal chord and at least one of said struts; and
at least one closure shell having a configuration complementary to said at least one base shell, and having trough-shaped channels for receiving said at least a longitudinal chord and said at least one strut;
said trough-shaped channels of said at least one base shell and said at least one closure shell together forming sleeves which enclose said at least a longitudinal chord and said at least one strut; wherein
the at least one base shell and the at least one closure shell have gluing flanges for a glued connection which protrude on contact points of the shells;
a course of exterior edges of the gluing flanges has a rounded design; and
end portions of said sleeved have a wall thickness which is reduced relative to a wall thickness of intermediate portions of said sleeves.

2. Structural member according to claim 1, wherein said struts are arranged in planes defined by respective pairs of said longitudinal chords.

3. Structural member according to claim 2, wherein the longitudinal chords and the transverse struts are glued in the trough-shaped channels.

4. Structural member according to claim 3, wherein interior surfaces of the trough-shaped channels are covered by an adhesive.

5. Structural member according to claim 4, wherein the adhesive is a liquid adhesive applied to the interior surfaces of the trough-shaped channels.

6. Structural member according to claim 5, wherein the adhesive is an adhesive film applied to the interior surfaces of the trough-shaped channels.

7. Structural member according to claim 6, wherein the adhesive film has, on at least a portion of its surface, a pull-off cover layer.

8. Structural member according to claim 7, comprising a fiber-reinforced plastic material.

9. Structural member according to claim 8, comprising a carbon-fiber-reinforced plastic material.

10. Structural member according to claim 8, wherein the shells comprise a fiber-reinforced plastic material.

11. Structural member according to claim 7, wherein the shells compromise of a fiber-glass reinforced plastic material.

12. Structural member according to claim 7, wherein the adhesive can be hardened by the effect of heat.

13. The structural member according to claim 1, wherein a transition to the reduced wall thickness forms a step.

14. A nodal point coupling device for use in a structural member for forming a framework of an airship, said structural member having at least three longitudinal chords which extend in parallel with each other to form a polygonal structure, and a plurality of diagonally extending transverse struts which connect nodal points of the longitudinal chords via a plurality of nodal point coupling devices situated at said nodal points, said nodal point coupling devices comprising:
at least one base shell having trough-shaped channels for receiving at least a longitudinal chord and at least one of said struts; and
at least one closure shell having a configuration complementary to said at least one base shell, and having trough-shaped channels for receiving said at least a longitudinal chord and said at least one strut;

said trough-shaped channels of said at least one base shell and said at least one closure shell together forming sleeves for enclosing said at least a longitudinal chord and said at least one strut; wherein the at least one base shell and the at least one closure shell have gluing flanges for a glued connection which protrude on contact points of the shells;

a course of exterior edges of the gluing flanges has a rounded design; and end portions of said sleeves have a wall thickness which is reduced relative to a wall thickness of intermediate portions of said sleeves.

15. The nodal point coupling device according to claim 14, wherein a transition to the reduced wall thickness forms a step.

* * * * *

UNITED STATES PATENT AND TRADEMARK OFFICE
CERTIFICATE OF CORRECTION

PATENT NO.   :   6,056,240
DATED        :   May 2, 2000
INVENTOR(S)  :   Klaus HAGENLOCHER

It is certified that error appears in the above-indentified patent and that said Letters Patent is hereby corrected as shown below:

On the title page:

Change "[73] Assignee: "Luftschiffbau GmbH, Germany" to --Luftschiffbau Zeppelin GmbH, Germany--

Signed and Sealed this

Seventeenth Day of April, 2001

*Attest:*

NICHOLAS P. GODICI

*Attesting Officer*     *Acting Director of the United States Patent and Trademark Office*